July 10, 1956

L. BEEMAN 2,754,388

PRESSURE SWITCH

Filed June 29, 1951

INVENTOR.
LYLE BEEMAN
BY
ATTORNEY

July 10, 1956
L. BEEMAN
2,754,388
PRESSURE SWITCH
Filed June 29, 1951
2 Sheets-Sheet 2
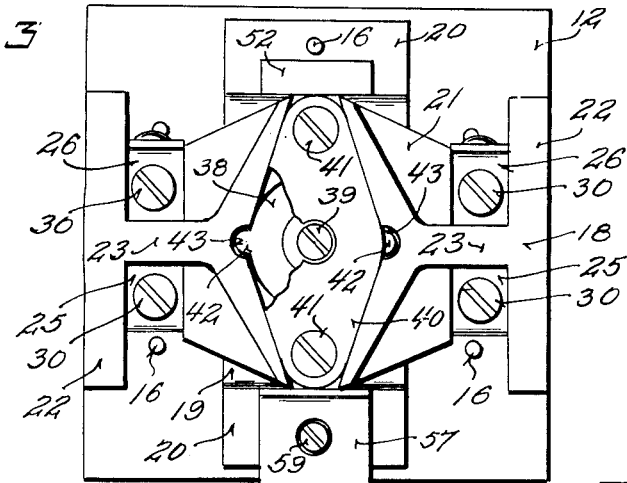
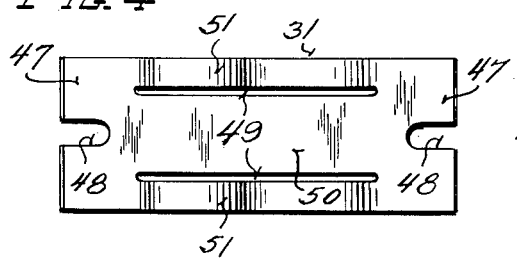
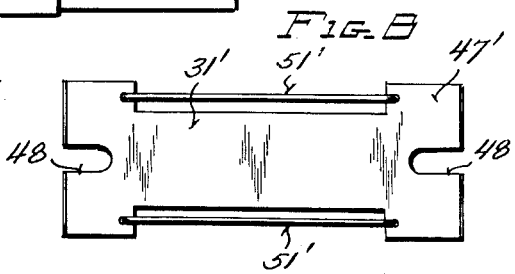
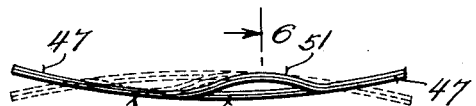
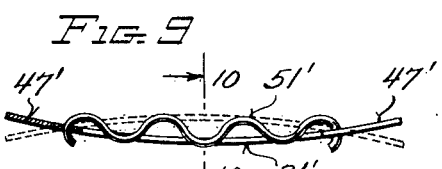
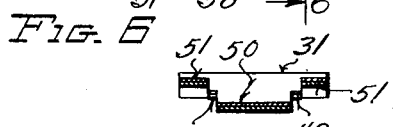
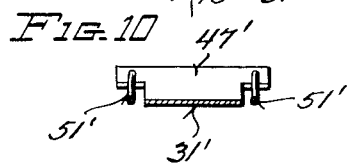
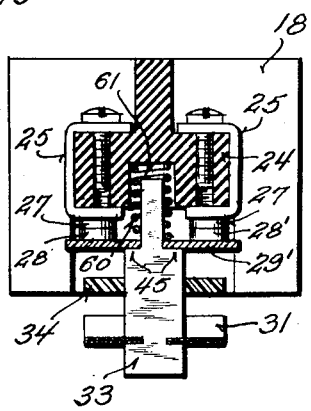
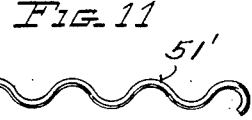
INVENTOR.
LYLE BEEMAN.
BY
ATTORNEY

United States Patent Office 2,754,388
Patented July 10, 1956

2,754,388
PRESSURE SWITCH
Lyle Beeman, Dayton, Ohio
Application June 29, 1951, Serial No. 234,269
5 Claims. (Cl. 200—83)

This invention relates to pressure switches.

Pressure switches are made and sold as self contained articles of commerce for use as pressure controlling devices in systems involving a pressure reservoir supplied by a motor-driven compressor. Such switches respond to the pressure in the reservoir and function to automatically de-energize the motor when the reservoir pressure reaches a predetermined maximum and to automatically re-energize the motor when the reservoir pressure has fallen to a predetermined minimum.

As heretofore designed, such switches invariably include heavily loaded lever mechanisms, commonly in the form of toggle mechanisms, supported on delicate knife-edged fulcrums which are subject to wear and constitute a common cause of unreliable action and short switch life.

One object of the present invention is to provide an improved pressure switch involving a new combination of parts so arranged as to eliminate the need for troublesome knife-edged fulcrums.

Another object is to simplify the construction and reduce the cost of pressure switches while increasing the life and reliability thereof.

Another object is to provide in a pressure switch an improved means for regulating the minimum pressure to which the switch responds.

Another object is to provide a simple and improved pressure switch particularly adapted for bi-polar use.

Other more specific objects and advantages will appear, expressed or implied, from the following description of a pressure switch constructed in accordance with the present invention.

In the accompanying drawings:

Fig. 3 is a top plan view.

Figs. 4 and 5 are views in plan and edge elevation, respectively, of a snap-action element included in the pressure switch shown.

Fig. 6 is a sectional view taken on the line 6—6 of Fig. 5.

Fig. 7 is a detail illustrating a modified switch arrangement.

Figs. 8 and 9 are views in plan and edge elevation, respectively, of a modified form of snap-action element.

Fig. 10 is a sectional view on the line 10—10 of Fig. 9.

Fig. 11 is a side elevation of the tension spring shown in Figs. 8 to 10.

Figure 1:
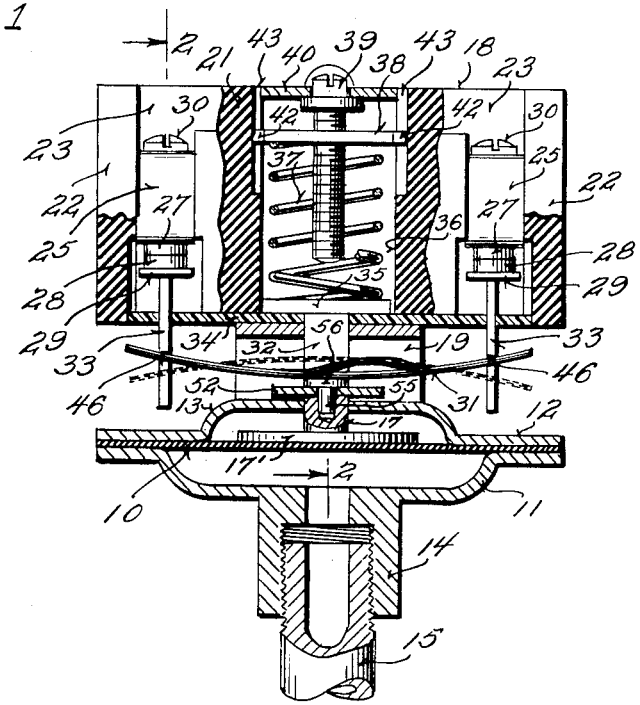
Figure 1 is a vertical sectional view of a pressure switch embodying the present invention.

The pressure switch shown is equipped with a conventional pressure chamber including a flexible diaphragm 10 of rubber or the like whose margin is gripped between a dished disk 11 and a substantially square cover plate 12 having a dished portion 13 concentrically disposed with respect to the disk. A hollow nipple 14 depending from the disk 11 is internally threaded to receive the end of a pressure conductor pipe 15 by which the chamber is supported and through which the diaphragm is exposed to the pressure in pressure reservoir. The disk 11 and plate 12 are poined by suitable means such as screws 16.

A short plunger 17 guided in the dished portion of the plate 12 is equipped with a supporting disk 17' that rests upon the diaphragm 10 and functions to move the plunger 17 in response to pressure-induced flexing of the diaphragm in a well known manner.

A switch-carrying terminal block 18 is attached to the plate 12, preferably through a suitable bracket 19 having an elevated portion spanning the dished portion 13 of the plate. The ends of the bracket 19 terminate in supporting feet 20 attached to the plate 12 through the screws 16 heretofore mentioned.

The terminal block 18 may be variously fashioned. In this instance the block includes a central body portion 21 and two parallel vertical plate-like portions 22 spaced laterally therefrom and rigidly joined thereto by vertical webs 23 and rather thick cross-bar formations 24, each of which projects laterally in opposite directions beyond the adjacent web.

Suitable metal clips 25 and 26, shaped to embrace a side of each cross-bar formation 24, and confined between the central portion 21 and side plate portions 22 of the terminal block, provide convenient conducting supports for appropriate switch contacts. In the device shown in Figs. 1, 2 and 3 two pairs of coacting switch contacts are provided. A stationary contact 27 of one switch is attached to the lower end of each of two clips 25, and a coacting movable contact 28 is attached to the end of a resilient supporting arm 29 riveted or otherwise attached to the side of each of the other two clips 26.

Each of the clips 25 and 26 is releasably secured by screws 30 which also function as electrical binding posts or terminals. It will of course be understood that each pair of coacting stationary and movable contacts 27 and 28 constitutes a separate switch connectable into either side of a motor circuit through the connected screws 30, so as to break the circuit when the contacts are separated. Each of these switches is preferably biased toward open position by the resilient supporting arm 29.

The movable contacts 28 of both switches are simultaneously actuated and controlled by a resilient snap-action element which responds automatically to the position of the pressure responsive plunger 17 hereinabove mentioned. The snap-action element may assume various forms and may be operatively related to the plunger 17 and to the switches in various ways. In this instance a snap-action element 31 is shown having an intermediate portion interposed between the plunger 17 and an opposed spring-loaded plunger 32 projecting downward from the center of the terminal block 18, the ends of the element 31 being separately engaged with thrust elements 33 through which the contact supporting arms 29 are actuated and controlled.

The spring-loaded plunger 32 is shown projecting through a guide plate 34, provided in the base of the block 18 and having a circular head 35 freely guided in a cylindrical chamber 36 formed centrally of the block. The plunger 32 is urged toward the lower position shown in Fig. 1 by a spring 37 confined between the plunger head 35 and a circular nut 38 on a screw 39, the thrust of the screw 39 being sustained by a reaction plate 40 overlying the chamber 36 and anchored to the top of the block 18 by suitable screws 41. The screws 41 extend downward through the block 18 and into the bracket 19 to secure the block to the latter. Projecting ears 42 on the nut 38 coact with grooves 43 in the walls of the chamber 36 to prevent rotation of the nut, and the exposed end of the screw is slotted or otherwise fashioned to facilitate manual rotation thereof for the purpose of regulating the thrust of the spring 37 upon the plunger 32.

In this instance the switch-actuating thrust elements 33 comprise relatively stiff strips of suitable insulating material, each projecting through and guided by the plate 34 and additionally guided at their upper ends in slots 44 provided in the block 18 and into which they project. The upper end of each thrust element 33 is reduced so as to extend through a contact carrier arm 29 and to provide shoulders 45 upon which the arm 29 normally rests. The lower portion of each element 33 is interlocked with an end of the snap-action element 31. For that purpose the opposite edges of each element 33 are notched, as at 46, to receive a bifurcated end 47 of the element 31, and a longitudinal slot 48 in the latter is adapted to receive the reduced portion formed between the edge notches 46 of the former.

The snap-action element shown in Figs. 4, 5 and 6 is composed of two loosely superimposed resilient strips, preferably of metal, each being longitudinally slotted, as at 49, to provide an intermediate longitudinal portion 50 and two separate side portions 51 interconnected by the end heads 47. It has been found that by the use of multiple strips, thus superimposed, it is possible to greatly increase the strength and power capacity of the element 31 to that required in this instance and, at the same time, avoid excessive internal stresses and strains that commonly cause early fatigue and short life in snap-action elements of this kind.

In this instance the side portions 51 are corrugated or otherwise bent to foreshorten the same, so as to set up longitudinally resilient tension therein and to consequently subject the intermediate portion 50 to longitudinal compression, thereby causing the latter to assume a longitudinally bowed or arched form, as indicated. To avoid objectionable localized stresses, each side portion 51 is preferably so bent as to form an S curve of rather long radii. The construction is such that, as the element 31 is forcibly flexed from either the full line or broken line curved condition shown in Figs. 1 and 5 through a substantially straight dead center position, it suddenly flexes into a condition of reverse curvature with a snap action.

Fig. 1 illustrates in full lines the relative positions of the several parts of the pressure switch when the pressure in the pipe 15 is at a minimum. It will be noted that the position and curvature of the snap-action element 31 is such as to support both thrust elements 33 in elevated position, so that each reacts on a switch arm 29 to hold its contact 28 against the coacting stationary contact 27. Both switches are thus closed so that the motor-driven compressor, controlled thereby, is energized to increase the fluid pressure in the reservoir and connected pipe 15.

It will also be noted that in this position of the parts the thrust elements 33 function to hold the ends of the snap-action element 31 against movement. However, as the pressure in the pipe 15 increases, the diaphragm 10 reacts against the plunger 17 to gradually elevate the same against the resistance of the spring loaded plunger 32 and also against the intermediate portion of the snap-action element 31, reducing the curvature therein and causing the latter to approach a dead center condition. When this condition is reached, the element 31 snaps into the broken line position of reverse curvature, whereupon the ends thereof react to lower the thrust elements 33 and thus permit both movable contacts 28 to withdraw from the stationary contacts 27 thereby to open both switches. This action occurs at a predetermined point in the upward movement of the plunger 17.

It will of course be understood that the degree of pressure in the pipe 15 at which the switches open in the manner above described is dependent upon the degree of pressure exerted by the spring 37 upon the plunger 32, and that this may be conveniently regulated by appropriate adjustment of the screw 39. The maximum fluid pressure in the pipe 15 and connected reservoir is thus predetermined by the position of the screw 39.

It will also be understood that the thrust elements 33 function to limit the extent of movement of the ends of the snap-action element 31. That is to say, the upward position of each element 33 is determined by the position of the switch arm 29 when the switches are in the closed position shown, and when the switches open in the manner above described the elements 33 move into their lowermost position against the plate 12, thereby limiting the motion of the ends of the element 31.

During a fall in pressure in the pipe 15, the spring loaded plunger 32 reacts on the mid-portion of the element 31 to depress the same from the broken line position shown while the ends of the element 31 are held against further depression by the elements 33. This results in again flexing the element 31 toward a dead center position and, when such position is reached, the element 31 suddenly flexes into the full line curvature shown, the ends thereof functioning to again elevate the elements 33 and thereby close both switches by forcing the movable contacts 28 against the contacts 27. This action occurs at a predetermined position of the plungers 17 and 32 and at a predetermined minimum pressure in the pipe 15, whereupon the motor driven compressor is re-energized.

It will be noted that in the arrangement above described the snap-action element assumes a floating condition, the central portion thereof being free to rise and fall with each rise and fall of the opposed plungers 17 and 32, and the ends thereof being free to snap up or down as the element passes through dead center in one direction or the other. It will be further noted that while the switches are closed the ends of the element 31 are elevated and that the switch-opening snap action of this element occurs at one definite position of the plunger 17, and that while the switches are open the ends of the element 31 are depressed so that the subsequent switch-closing snap action occurs at a definite position of the plunger 17 below that at which the switch-opening snap action occurs. In other words, there is normally a predetermined difference in fluid pressure in pipe 15 between the maximum pressure at which the switch-opening snap action occurs and the minimum pressure at which the switch-closing snap action occurs.

As above pointed out, the maximum pressure at which the switch-opening snap action occurs may be regulated and predetermined by adjustment of the screw 39. Provision is made in the device shown for modifying the minimum pressure at which the switch-closing action occurs without affecting the predetermined maximum pressure, so as to change the difference in pressure between the maximum and minimum. Although this might be accomplished in various ways, the means employed in this instance has proven satisfactory.

The mechanism shown for this purpose includes a spring loaded lever 52 fulcrumed at one end in a vertically enlarged opening 53 in one side of the bracket 19 and extending loosely through an opening 54 of limited depth purposely designed to limit the vertical swing of the lever. This lever is permanently engaged with the plunger 17 for movement therewith and in this instance is positioned by the stem 55 of a button 56 interposed between the plunger 17 and the snap action element 31, the stem 55 being extended through the lever 52. The free end of the lever is preferably elevated, as indicated at 57, and rests upon the upper end of a compression spring 58 seated upon the flanged end of a cylindrical nut 59. The nut 59 is threaded on one of the screws 16, heretofore mentioned, which is suitably extended to receive it. The nut 59 extends loosely through the lever end 57 and is slotted or otherwise fashioned for convenient manipulation.

The fulcrumed end of the lever 52 normally rests on the bottom of the opening 53 and the spring 58 acts through the lever to partially oppose the thrust of the spring-loaded plunger 32 as the latter lowers toward the region where the switch-closing action normally occurs. During this downward movement of the plunger 32 the spring 58 is further compressed so as to increase the resistance offered by it against the plunger 32. Since the spring 58 thus aids the plunger 17 in sustaining the thrust of the plunger 32, the degree of fluid pressure necessary to sustain the thrust of the plunger 32 is reduced, and the switch-closing snap action occurs at a reduced minimum pressure. This minimum pressure may be regulated and predetermined by adjustment of the nut 59 in a manner to vary the initial compression of the spring 58.

Adjustment of the nut 59 will not however affect the maximum pressure at which the switch-opening snap action occurs, as predetermined by the adjustment of the screw 39. To insure this condition the upward swing of lever 52 is limited by the top of the opening 54, so that in that upper limiting position the spring 58 is ineffective to resist the plunger thrust. The lever 52 reaches this upper limiting position before the plunger 32 reaches the position where switch-opening action occurs, and as this plunger continues to rise, the fulcrumed end of the lever is free to rise and thus freely follow the continued rise of both plungers 32 and 17 without materially influencing either.

Figs. 8, 9 and 10 illustrate a modified form of snap-action element capable of use interchangeably with that shown in Figs. 1 to 6. The element therein shown comprises a resilient strip 31', preferably of metal, having laterally extended ends 47' interconnected by a pair of tension springs 51' spaced laterally from the main body of the strip. In this instance each spring 51' is formed of spring wire corrugated to impart longitudinal resilience thereto, each being of a length to longitudinally compress the strip 31' and thereby impart thereto the curvature indicated.

These springs function in much the same manner as do the side portions 51' of the element 31 hereinabove described. The opposite ends of the element 31 also contain slots 48 adapting them to be interlocked with the thrust elements 33 in much the same manner as with the element 31. It is understood of course that the element 31' may be used singly, as shown, or in superimposed multiple as in the case of the element 31.

Figure 2:
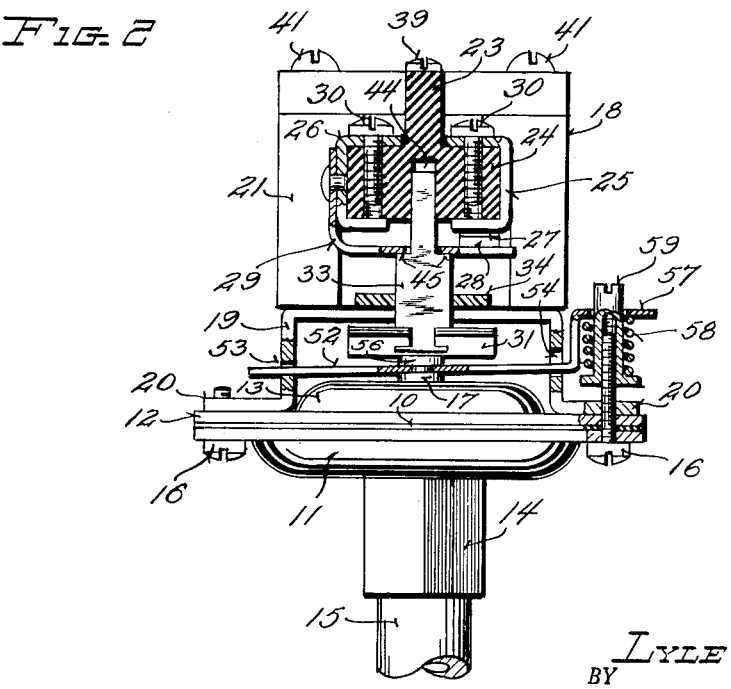
Fig. 2 is a sectional view taken substantially along the line 2—2 of Fig. 1.

As hereinabove noted, in the pressure switch shown in Figs. 1 to 3 the several switch contacts are arranged for multi-polar use and provide for a single break in each of two sides of a motor circuit. In the modified arrangement of Fig. 7 the switch contacts are arranged for a double break in each of two sides of a circuit without material change in the terminal block 18.

In the Fig. 7 device each of the clips 25 carries a stationary contact 27 at its lower end, and a conducting bridge piece 29' supported on the shoulders 45 of each thrust element 33 carries a pair of movable contacts 28' positioned to coact with contacts 27 to provide a double-break switch. As in the device hereinabove first described each of the thrust elements 33 projects through and is guided in the plate 34 and is interlocked with the snap-action element 31. In this instance however a coil spring 60 seated in an opening 61 provided in the base of the bar formation 24 reacts on the bridge piece 29' to bias the movable switch contacts 28 toward open position. Except for the changes above noted the structure and function of the Fig. 7 device are the same as in the device of Figs. 1 to 6.

Various changes may be made in any of the embodiments of the invention hereinabove specifically described without departing from or sacrificing the advantages of the invention as defined in the appended claims.

I claim:

1. In a device of the character described the combination of a flexibly resilient strip, resilient means connecting the ends of said strip to bow the same and to impart snap-action movement to said strip ends upon reversal of said bow, means operable on an intermediate portion of said strip to move the same in one direction, resilient means yieldably opposing said last named means and operable to move said intermediate portion in an opposite direction, means limiting movement of said strip ends to thereby effect a bow in said strip in one direction or the other dependent upon the direction of movement of said intermediate portion, and switch means actuated by snap-action movements of said strip ends.

2. In a device of the character described the combination of a flexibly resilient strip, resilient means connecting the ends thereof to bow the same and to impart snap-action movement to said strip ends upon reversal of said bow, means operable on an intermediate portion of said strip to move the same in one direction, resilient means yieldably opposing said last named means and operable to move said intermediate portion in an opposite direction, elements flexibly connected to said strip ends to move therewith and to limit movement thereof to thereby effect a bow in said strip in one direction or the other dependent on the direction of movement of said intermediate portion, and switch means actuated by movement of said elements.

3. In a device of the character described the combination of a multiple leaf spring, resilient means connecting the ends of said spring to bow the same and to impart snap-action movement to said ends upon reversal of said bow, means operable on an intermediate portion of said spring to move the same in one direction, resilient means yieldably opposing said last named means and operable to move said intermediate portion in an opposite direction, means limiting the movement of said spring ends to thereby effect a bow in said strip in one direction or the other dependent upon the direction of movement of said intermediate portion, and switch means actuated by snap-action movements of said spring ends.

4. In a pressure switch the combination of a flexibly resilient strip, resilient means connecting the ends of said strip to bow the same and to impart snap-action movement of said strip ends upon reversal of said bow, fluid pressure responsive means operable on an intermediate portion of said strip to move the same in one direction, resilient means yieldably opposing said last named means and operable to move said intermediate portion in an opposite direction, means limiting movement of said strip ends to thereby effect a bow in said strip in one direction or the other dependent upon the direction of movement of said intermediate portion, and switch means actuated by snap-action movements of said strip ends.

5. In a pressure switch the combination of a support, a terminal block mounted thereon in spaced relation thereto, a flexibly resilient strip disposed between said support and block, resilient means connecting the ends of said strip to bow the same and to impart snap-action movement to said strip ends upon reversal of said bow, switch means including relatively stationary contacts carried by said block and coacting movable contacts guided thereby and connected for actuation by said strip ends, fluid pressure responsive means on said support operable on an intermediate portion of said strip to move the same in one direction, resilient means within said terminal block yieldably opposing said last named means and operable to move said intermediate portion in an opposite direction, and means including actuating connections between said strip ends and said movable contacts for limiting movement of said strip ends to thereby effect reversal of said bow by movement of said intermediate portion in either of said directions.

References Cited in the file of this patent

UNITED STATES PATENTS

| Re. 19,300 | Eggleston et al. | Sept. 4, 1934 |
| 1,721,163 | Muffly | July 16, 1929 |
| 1,905,788 | Bast | Apr. 25, 1933 |
| 1,985,337 | Bondurant | Dec. 25, 1934 |
| 2,281,544 | Beeman et al. | May 5, 1942 |
| 2,290,093 | Burch | July 14, 1942 |
| 2,307,265 | Hansen | Jan. 5, 1943 |
| 2,342,658 | Grooms | Feb. 29, 1944 |
| 2,511,526 | Bugge | June 13, 1950 |
| 2,620,413 | Johnson | Dec. 2, 1952 |
| 2,623,963 | Wolfe et al. | Dec. 30, 1952 |